United States Patent
Potis

[11] Patent Number: 5,833,578
[45] Date of Patent: Nov. 10, 1998

[54] ELECTRONICALLY ACTUATED AUXILIARY THROTTLE CONTROL SYSTEM

[76] Inventor: Michael R. Potis, 38162 Mt. Kisco Dr., Sterling Heights, Mich. 48310

[21] Appl. No.: 997,139

[22] Filed: Dec. 23, 1997

Related U.S. Application Data

[63] Continuation of Ser. No. 458,575, Jun. 2, 1995, abandoned.

[51] Int. Cl.[6] ........................................ F02D 11/10
[52] U.S. Cl. .................... 477/165; 74/473.19; 74/482; 74/523; 123/399; 123/400; 180/335
[58] Field of Search .............................. 74/473.1, 473.19, 74/482, 513, 514, 523; 477/165; 123/396, 399, 400; 180/333, 334, 335; 200/61.88

[56] References Cited

U.S. PATENT DOCUMENTS

| | | | |
|---|---|---|---|
| 1,716,814 | 6/1929 | Case | 477/165 |
| 1,795,600 | 3/1931 | Halley | 477/165 |
| 1,815,772 | 7/1931 | Gray | 477/165 |
| 1,815,773 | 7/1931 | Gray | 477/165 |
| 1,819,111 | 8/1931 | Neal | 477/165 |
| 1,819,688 | 8/1931 | Moore | 477/165 |
| 1,823,622 | 9/1931 | Mitchell | 477/165 |
| 1,838,289 | 12/1931 | Smith | 477/165 |
| 1,856,192 | 5/1932 | Roeder | 477/165 |
| 1,861,394 | 5/1932 | Hoover | 477/165 |
| 1,959,881 | 5/1934 | Smelzer | 477/165 |
| 1,968,482 | 7/1934 | Eisenhauer | 477/165 |
| 2,336,682 | 12/1943 | Gross | 74/490.15 |
| 4,109,745 | 8/1978 | Hveem | 477/165 |
| 4,586,471 | 5/1986 | Horada et al. | 123/399 |
| 4,856,477 | 8/1989 | Hanaoka et al. | 123/399 |
| 5,033,433 | 7/1991 | Churchill et al. | 123/399 |
| 5,237,891 | 8/1993 | Neubauer et al. | 74/560 |
| 5,367,997 | 11/1994 | Kawamura et al. | 123/399 |
| 5,393,276 | 2/1995 | White et al. | 477/91 |
| 5,408,899 | 4/1995 | Stewart | 74/513 |

*Primary Examiner*—Charles A. Marmor
*Assistant Examiner*—Troy Grabow
*Attorney, Agent, or Firm*—Harness, Dickey & Pierce, P.L.C.

[57] ABSTRACT

An auxiliary throttle control arrangement is partially housed in and forms an integral part of a handle assembly for a gear shift lever. The actuator component of the control arrangement is in the shape and general configuration of a trigger. Together, the trigger and handle assembly are ergonomically styled to form fit the hand. The trigger is spring loaded to provide initial resistance to movement and to return the trigger to its original position as applied pressure is released. The trigger is mechanically coupled to a potentiometer device housed in the handle assembly. As the trigger position is changed by the vehicle operator, the resulting movement of the potentiometer produces a control signal having a variable output voltage that is used by a control mechanism to change the engine throttle position. Thus, the subject invention provides a secondary method of accelerating an automotive vehicle from a stopped position. This ability to increase engine revolutions without the use of the accelerator pedal provides a controlled technique of preventing vehicle roll back.

17 Claims, 3 Drawing Sheets

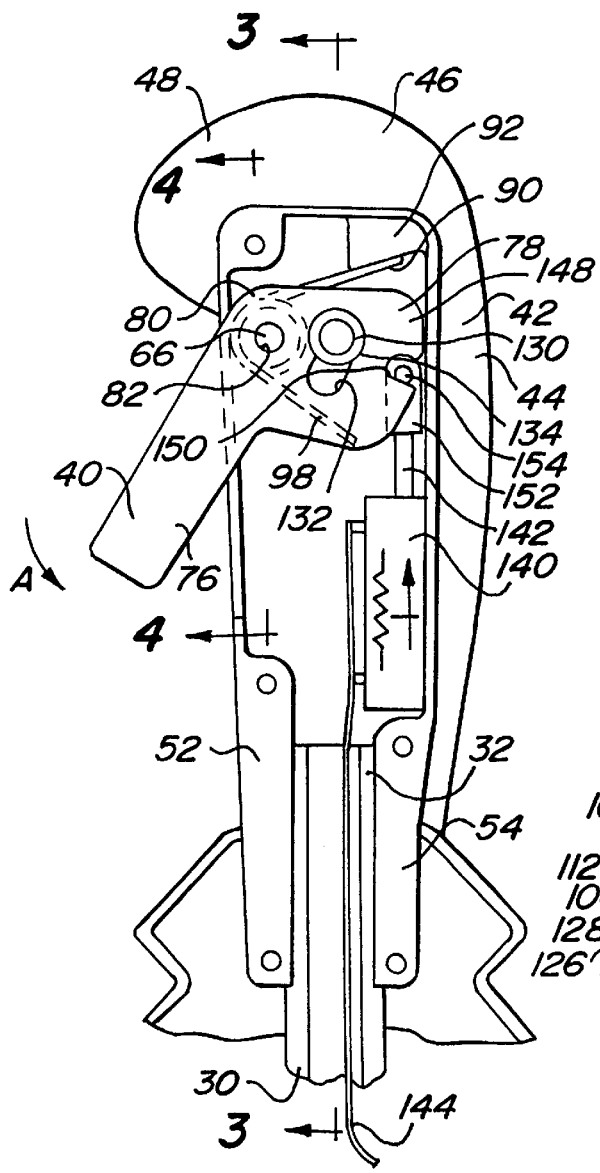
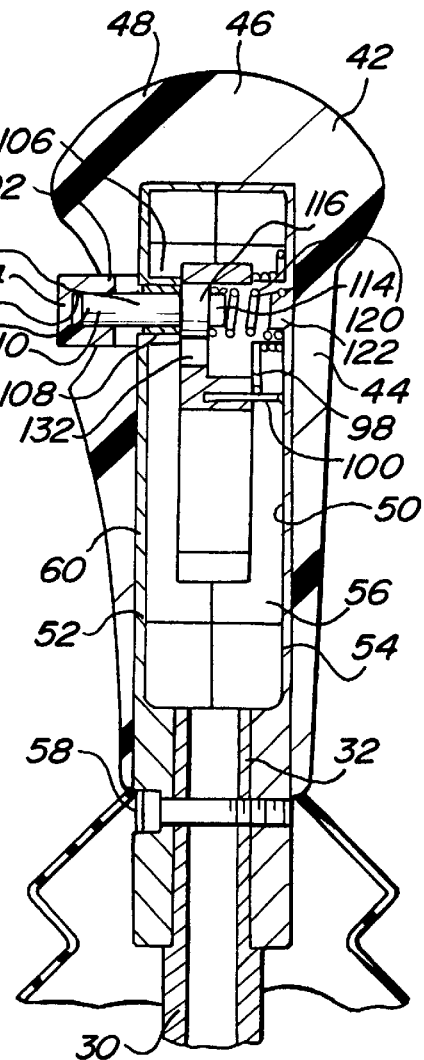
Fig-2
Fig-3

ELECTRONICALLY ACTUATED AUXILIARY THROTTLE CONTROL SYSTEM

This is a continuation of U.S. patent application Ser. No. 08/458,575, filed Jun. 2, 1995, now abandoned.

BACKGROUND AND SUMMARY

The present invention relates in general to a throttle control device for an automotive vehicle. In particular, the present invention relates to an auxiliary throttle control system that is electronically actuated by a hand operated trigger.

Modernly, most vehicles are available with a choice of either automatic or manual transmissions. While automatic transmissions are recognized as providing hands-free shifting throughout a vehicle's range of speed, the advantages associated with manual transmissions have long been recognized and continue to be demanded by a large segment of the purchasing public. The major advantages over automatic transmissions that are attributable to the popularity of manual transmissions include lower initial cost, enhanced driving performance, and increased gas mileage.

In conventional vehicles with manual transmissions, difficulty is often encountered in situations where it is desired to keep the vehicle motionless when stopped on a steep incline or when movement up a steep incline is initiated from a stop. During such situations, an operator must simultaneously disengage the clutch by depressing the clutch pedal and depress the brake pedal, thereby requiring both of the operator's feet. To proceed uphill from a stop requires quick movement of the operator's right foot from the brake pedal to the accelerator pedal coordinated with release of the clutch pedal to increase engine rpms sufficiently to avoid stalling of the engine and to impart forward motion to the vehicle.

The required motion must be appropriately timed and is often difficult on steep hills where the vehicle is urged downhill until engine rpms are sufficient to overcome the force of gravity. If the clutch is released too slowly, the vehicle rolls down the hill against the driver's will and possibly into another vehicle or other obstacle. Conversely, the engine will stall if the clutch is released too quickly, and the operator must attempt to restart the engine without the benefit of the foot operated accelerator pedal (e.g. left and right feet must operate the clutch and brake pedals, respectively). In addition, the above-described operation of vehicles with manual transmissions on hills often subjects the clutch to excessive wear. Furthermore, if a vehicle's engine is improperly timed, it may be susceptible to stalling in situations where the operator's feet are engaged in simultaneous operation of the clutch and brake pedals and unable to operate the foot actuated throttle.

Various auxiliary throttle control devices for vehicles are known. For example, U.S. Pat. No. 1,716,814 discloses a manually operated auxiliary throttle control that is connected to a foot operated throttle control or accelerator. The throttle control is secured to the gearshift lever and is interconnected to the primary foot operated throttle control through a complex mechanical linkage having a system of levers. The auxiliary throttle control is actuated by a vehicle operator through the raising of a handle. Similar mechanically actuated arrangements interconnected with a conventional foot operated throttle control pedal are shown and described in U.S. Pat. Nos. 1,815,772; 1,838,289; 1,959,881; 1,823,622; 1,819,688; 1,819,111; and 1,795,600.

Another example of an auxiliary throttle control is disclosed in U.S. Pat. No. 1,968,482. In this arrangement, a manual actuated mechanism is mechanically interconnected with the vehicle carburetor, independent of the foot actuated throttle control. Similar arrangements are shown and described in U.S. Pat. Nos. 1,861,394; 1,856,192; and 4,109,475.

The prior known devices for auxiliary throttle control such as those discussed above disclose various arrangements allegedly operable for providing a hand actuated throttle control. While some of these devices may have had a limited amount of commercial success, none are without associated drawbacks and disadvantages. Particularly, all known auxiliary throttle control devices incorporate complex mechanical linkage for directly or indirectly interconnecting a manual operable element with the vehicle carburetor. Such arrangements are attendant with disadvantages and drawbacks, including but not limited to, increased manufacturing and assembly costs, and an increased likelihood of mechanical failure.

Thus, it is desirable to provide an auxiliary throttle controlled device which overcomes the drawbacks and disadvantages of the prior art by incorporating an electronically controlled actuation mechanism into an auxiliary vehicle throttle control arrangement, thereby lowering manufacturing and assembly costs and simultaneously increasing product reliability.

The present invention comprises an improvement over known throttle control systems, including those disclosed in the aforementioned patents, by providing an improved auxiliary throttle control arrangement. More particularly, the present invention provides an electronically actuated auxiliary throttle control arrangement. In the preferred embodiment, the auxiliary throttle control arrangement is partially housed in and forms an integral part of a gear shift lever handle assembly. The actuator component of the control arrangement is in the shape and general configuration of a trigger. Together, the trigger and handle assembly are ergonomically styled to form fit the hand. The trigger is spring loaded to provide initial resistance to movement and to return the trigger to its original position as applied pressure is released. The trigger is mechanically coupled to a potentiometer device housed in the handle assembly. As the trigger position is changed by the vehicle operator, the resulting movement of the potentiometer produces a control signal having a variable output voltage that is used by a control mechanism to change the engine throttle position. Thus, the subject invention provides a secondary method of accelerating an automobile from a stopped position. This ability to increase engine revolutions without the use of the accelerator pedal provides a controlled technique of preventing vehicle roll back.

In one form, the present invention provides an electronically actuated throttle control system adapted for use with a vehicle having an engine compartment, a driver's compartment and a carburetor having a throttle mechanism located in the driver's compartment. The electronically actuated throttle control system includes a movable element located in the driver's compartment which is under the control of the vehicle operator. Additionally, the throttle control system includes a signal generating means for generating a control signal indicative of the position of the movable element. Further, the throttle control system includes throttle adjustment means for receiving the control signal and adjusting the throttle mechanism in response thereto.

In a preferred form, the present invention provides a throttle control system for an automotive vehicle of the type having a driver's compartment, an engine compartment, a manual transmission, and a carburetor including a throttle control mechanism located in the engine compartment. The throttle control system includes a primary throttle control arrangement including a foot actuated pedal mechanically interconnected with the carburetor, and an auxiliary throttle control arrangement electronically interconnected with the carburetor. The auxiliary throttle control arrangement includes a gear shift lever connected with the manual transmission for shifting the manual transmission between a plurality of speeds. The gear shift lever includes a handle assembly located in the driver's compartment which includes a trigger under the control of a vehicle operator. The trigger is interconnected with a potentiometer which is operable for producing a control signal indicative of the position of the trigger.

BRIEF DESCRIPTION OF THE DRAWINGS

Additional objects and advantages of the present invention will become apparent from a reading of the following detailed description of the preferred embodiment which makes reference to the drawings of which:

FIG. 2 is an enlarged side elevational view of the gear shift lever and handle assembly of the present invention shown in FIG. 1;

FIG. 3 is a cross-sectional view taken through the line 3—3 of FIG. 2;

DETAILED DESCRIPTION OF THE PREFERRED EMBODIMENT

The present invention provides a throttle control system specifically adapted for use with an automotive vehicle having a manual transmission. In the exemplary embodiment illustrated throughout the drawings, the auxiliary throttle control is illustrated to include an actuation mechanism located in a handle assembly attached to a gear shift lever.

Figure 1:
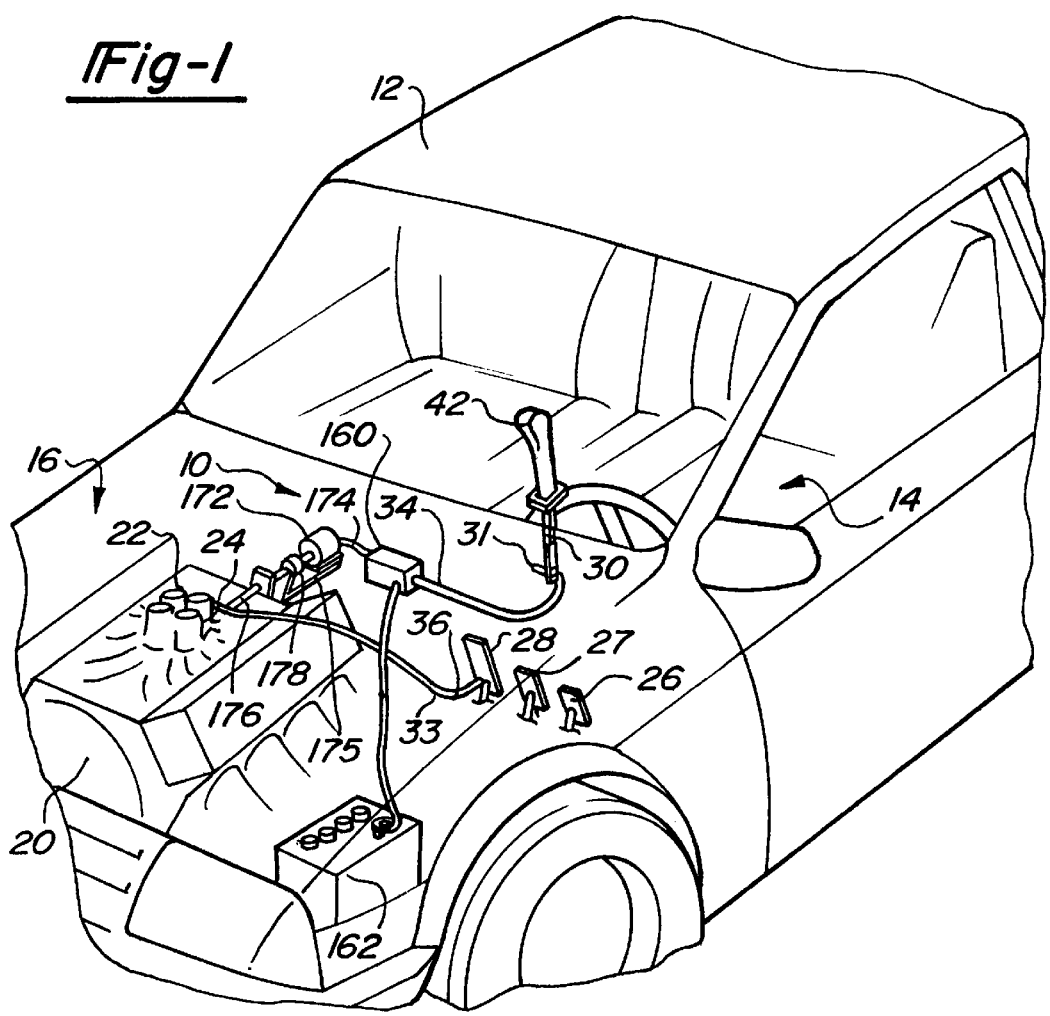
FIG. 1 is perspective view illustrating an auxiliary throttle control system constructed in accordance with the teachings of the preferred embodiment of the present invention shown in an exemplary use environment.

Turning to the drawings, in which identical or equivalent elements have been denoted with like reference numerals, a throttle control system embodying the present invention is illustrated in FIG. 1 and is identified generally at reference numeral 10. Shown in FIG. 1 is a perspective view of throttle control system 10 operatively arranged within an automotive vehicle 12. The automotive vehicle 12 partially depicted in FIG. 1 is shown to conventionally include a driver's compartment 14 separated from an engine compartment 16 by a fire wall (not shown), a manual transmission (not shown), and an internal combustion engine 20 having a carburetor 22 controlled by a throttle control mechanism 24. Vehicle 12 further conventionally includes a clutch pedal 26, a brake pedal 27, and a foot actuated accelerator pedal 28. While not shown, it will be understood that the appropriate mechanical linkage associated with clutch pedal 26 and brake pedal 27 extends through the fire wall.

In the exemplary embodiment illustrated, vehicle 12 is shown to further conventionally include a gear shift lever 30 with a first end 31 adapted to be connected to the manual transmission and a second end 32 upwardly extending into driver's compartment 14. As will be appreciated by those skilled in the art, gear shift lever 30 is adapted to be grasped by the palm of the right hand of the operator (not shown) of vehicle 12. With an automotive vehicle powered by a manual transmission, both arms and feet of the operator are normally used when driving rough and/or steep terrain. Typically, the left hand is on the steering wheel (not shown) of the vehicle, the right hand is on gear shift lever 30, the left foot operates clutch pedal 26, and the right foot alternates between accelerator pedal 28 and brake pedal 27 for respective operation. The present invention is specifically adapted to free the right foot of the operator from having to control two pedals substantially simultaneously, which is almost impossible if not very difficult, awkward and potentially hazardous to do.

Throttle control system 10 of the present invention includes a primary throttle control arrangement 33 and an auxiliary throttle control arrangement 34. In a conventional manner, the primary throttle control arrangement includes foot actuated accelerator pedal 28 which is located in the driver's compartment 14. In a manner well known in the art, accelerator pedal 28 is mechanically interconnected with throttle control mechanism 24 through a cable 36 extending through the fire wall. The primary focus of the subject invention is directed to the auxiliary throttle control arrangement 34 and much of the remainder of this detailed description will be concentrated thereon. As such, it will be appreciated by those skilled in the art, that primary throttle control arrangement 33 shown in the drawings is but one exemplary form with which auxiliary throttle arrangement 34 may cooperate.

Auxiliary throttle control arrangement 34 includes an actuation mechanism in the form of a moveable element 40 under the control of a vehicle operator (not shown). In the preferred embodiment, the movable element is a hand operable switch or trigger member 40 in the form of a trigger. Trigger member 40 is attached to a shift lever handle assembly 42 which is fixed securely to upper end 32 of gear shift lever 30. While trigger member 40 is shown incorporated into a gear shift lever handle 42, those skilled in the art will appreciate that the invention is not so limited in scope. In this regard, the actuation mechanism 40 can readily adapted for any suitable position within passenger compartment 14 of vehicle 12.

Figure 4:
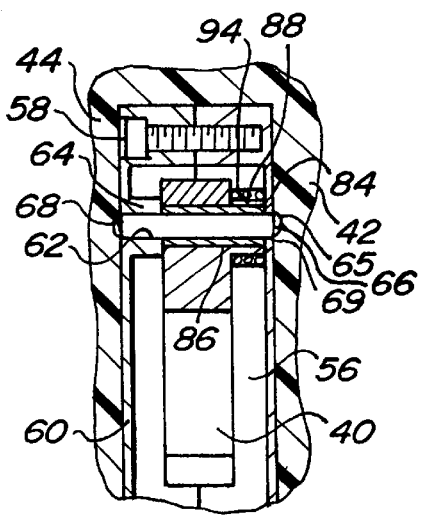
FIG. 4 is a cross-sectional view taken through the line 4—4 of FIG. 2.

Referring specifically to FIGS. 2–4, shift lever handle assembly 42 of auxiliary throttle control arrangement 34 will be described in more detail. Shift lever handle assembly 42 is shown to preferably include an outer shell 44 constructed of a suitable cover material such as injection molded plastic or a leather wrapped composite. Outer shell 44 is ergonomically fashioned to include a bulbous portion 46 at an upper end 48 and to be form fitting to the hand of the vehicle operator. Outer shell 44 is further formed to define an internal channel 50 adapted to receive a pair of cooperating casing components 52 and 54. However, it will be appreciated by those skilled in the art that casing components 52 and 54 may be alternatively constructed as a single component. Casing components 52 and 54, which are each preferably constructed of a die cast metal or other suitable material, cooperate to define an internal cavity 56 when assembled. The casing components 52 and 54 are secured together and to the gear shift lever with threaded fasteners 58. In the preferred embodiment, outer shell 44 is secured to shift lever handle assembly 42 with an appropriate adhesive material. As will be appreciated below, internal cavity 56 functions to house the remaining components of handle assembly 42.

As shown most clearly in FIGS. 3 and 4, a first of the casing components 52 has a side wall 60 formed to include an aperture 62 adjacent its upper end. Side wall 60 is further formed to include an inwardly extending boss projection 64 coaxially disposed with respect to aperture 62 and arranged to receive a pivot pin 66 for pivotal mounting of trigger member 40. Pivot pin 66 is preferably constructed of metal, or other suitable material, includes a hardened surface with a smooth ground finish, and is appropriately sized diametrically to produce an interference with aperture 62 of casing component 52. The interference fit prevents rotational and axial movement of pivot pin 66 with respect to shift lever handle assembly 42.

When assembled, pivot pin 66 is disposed within aperture 62 and boss projection 64 such that predominantly more of its length extends into inner cavity 56 defined by casing components 52 and 54. Moreover, a sufficient amount of its length is engaged aperture 62 so as to have a first end 68 of pivot pin 66 flush with or extending slightly outward of an outer surface of the casing component 52. A second end 65 of pivot pin 66 is received into an aperture 69 formed in a second of the pair of casing components 54. When properly aligned as in the assembled position shown in the drawings, aperture 69 provides a locating and load bearing point for second end 65 of pivot pin 66.

Pivot pin 66 defines a central axis about which trigger member 40 is mounted for pivotal rotation. In this regard, trigger member 40 is rotatable between a non-actuated position (as shown in FIG. 2) and a fully-actuated position. In the embodiment illustrated, trigger member 40 rotates from its non-actuated position to its fully-actuated position in a direction counter clockwise about pivot pin 66, as indicated by arrow A in FIG. 2.

In the exemplary embodiment illustrated, the configuration of trigger member 40 resembles an inverted golf club head. In this regard, as shown most clearly in FIG. 2, trigger member 40 is formed to include a downward and outward extending shaft portion 76 interconnected to a head portion 78 at a heel area 80. Pivotal mounting to pivot pin 66 is provided through an aperture 82 extending through heel area 80. Trigger member 40 is preferably unilaterally constructed of a plastic injection molded material. However, any of a number of known materials would alternatively be suitable.

Further in the preferred embodiment, trigger member 40 is formed to include a hub-like cylindrical projection 84 extending outward and concentric with aperture 66. Cylindrical projection 84 is sufficiently large enough in diameter so as to provide an adequate wall thickness for proper function and assembly with a pivot bushing 86. Pivot bushing 86 is constructed of a suitable, self-lubricating bearing material, and assembled concentrically within aperture 69 of trigger member 40 so as to provide a wear resistant rotational bearing surface opposing pivot pin 66. Further, pivot bushing 86 functions to maintain the location and radial stability of the moving and stationary components throughout the service life of shift lever handle assembly 42.

Handle assembly 42 further includes biasing means for biasing trigger member 40 to its non-actuated position. In the preferred embodiment, the biasing means comprises a torsion spring 88 which circumferentially surrounds hub projection 84. Torsion spring 88 is shown in the drawings to include a stationary leg 90 positioned against a boss protrusion 92 (shown most clearly in FIG. 2) extending inward from second casing component 54, and a coil portion 94 circumferentially positioned over hub projection 84 of trigger member 40. Torsion spring 88 further includes a movable leg 98 contained against a metal retainer pin 100 press fit assembled together with the trigger member 40.

Handle assembly 42 further includes a release mechanism operatively arranged with trigger member 40 for preventing rotation of trigger member 40. In the preferred embodiment, the release mechanism includes a safety release 102 which must be actuated prior to rotation of trigger member 40 from its non-actuated position to an actuated position. In the preferred embodiment, safety release 102 includes a detent button 104 horizontally moveable within a through hole located in shift lever handle assembly 42. The through hole is defined in part by an inwardly extending boss portion 106 of casing component 52, and is located within a common horizontal plane as the axis defined by pivot pin 66. The inside diameter of boss portion 106 is sufficiently large enough and properly sized to provide an interference fit assembly with a thin-walled guide bushing 108. Guide bushing 108 is constructed of a suitable, self lubricating bearing material and is assembled concentrically within the through hole. Guide bushing 108 provides a wear resistant, sliding bearing and locating surface for a detent pin 110 disposed therein.

Detent pin 110 is constructed of a suitable, rigid plastic material and includes a cylindrical shaft portion 112 on one end and a larger diameter head portion 114 of shorter length at the opposite end. A cylindrical boss protrusion 116 is located adjacent to head portion 114 and is concentric thereto. It is also disposed concentrically within guide bushing 108. Shaft portion 112 extends outward from casing component 52. Cylindrical boss protrusion 116 of the detent pin 110 is used for location and retention of a compression spring 120 that is disposed concentrically between the detent pin 110 and casing component 54, where it is located on a similar boss protrusion 122 extending inwardly from the casing component 54.

Detent button 104 is disposed on a distal end 126 of detent pin shaft 112. Detent button 104 is preferably cylindrical in shape and has a cylindrical hole 128 extending from one end, but not entirely through, which is adapted to provide a snap-together assembly with the detent pin 110. In the illustrated embodiment, detent button 104 is disposed concentrically on the detent pin 110 and is constructed of a suitable plastic material.

As shown in FIGS. 2 and 3, detent pin 110 is adapted to engage an aperture 130 formed in head portion 78 of trigger member 40. Aperture 130 is appropriately sized to provide a clearance fit with head portion 114 of detent pin 110. A radially slotted hole 132 of lesser width extends downward from the center of the aperture 130. A radially slotted counter bore 134 terminates at the center of the smaller slotted hole 132 and provides a clearance slot for head portion 114 of detent pin 110 to move into as detent button 104 is depressed, thereby releasing trigger member 40 and allowing for rotation of trigger member 40 by the vehicle operator. In operation, as pressure on detent button 104 is released, compression spring 120 biases detent pin 110 to its extended position. With trigger member 40 released by the operator, head portion 124 of detent pin 110 engages the smaller slotted area 132 of trigger member 40, thereby locking the trigger member 40 in its non-actuated position (as shown in FIG. 2).

Auxiliary throttle control arrangement 34 is shown to further include a signal generating means for generating a control signal indicative of the position of trigger member 40. In the preferred embodiment, signal generating means comprises a potentiometer device 140 which is positioned internally within shift lever handle assembly 42. One suitable potentiometer device is a linear motion potentiometer 140 commercially available from Allied Systems as part number LCP8-10. However, it will be appreciated that auxiliary throttle control arrangement 34 may alternatively incorporate a rotary type potentiometer or any other device suitable for converting the change in position of trigger member 40 to an indicative electrical signal.

Linear potentiometer 140 is located vertically against the internal surface of the casing component 54 and is secured to this surface with appropriate threaded fasteners (not shown). In the preferred embodiment, the height of the wall of casing component 54 extends beyond a common parting line between the two components 52 and 54 in the area where linear potentiometer 140 is located, thereby producing a notched wall on casing component 52 in the adjacent area. Linear potentiometer 140 includes a threaded shaft 142 which is extended and retracted as trigger member 40 is rotated about pivot pin 66 in response to manipulation by the vehicle operator. In this regard, rotation of trigger member 40 counter clockwise (as indicated by arrow A in FIG. 2) to its actuated position serves to extend shaft 142 of potentiometer 140. As will be appreciated below, potentiometer 140 is connected to the first end of an electrical wire harness 144 that extends through the fire wall of automotive vehicle 12. More particularly, wire harness 144 is connected to the terminal pins (not shown) of linear potentiometer 140 and extend down through gear shift lever 30 and out through the fire wall (as shown in FIG. 1).

At a toe area 148 of head portion 78 of trigger member 40, a radiused groove 150 is disposed central to the width of the trigger member 40. Groove 150 is sufficiently wide so as to provide clearance for a clevis block 152 as trigger member 40 is rotated by the vehicle operator. Clevis block 152 has an internally threaded hole (not shown) sufficiently deep at one end to engage external threaded shaft 142 of a linear potentiometer 140, and further has a cylindrical through hole extending perpendicular to the internally threaded hole at the opposite end which is press fit assembled with a metal clevis pin 154. Clevis pin 154 is sufficient in length to extend out from clevis block 152 on both sides and engage groove 150, thereby providing a pivoting connection between the trigger member 40 and linear potentiometer 140.

Auxiliary throttle control arrangement 34 of the present invention is shown to further include throttle adjustment means for receiving the control signal generated by potentiometer 140 and adjusting fuel flow to carburetor 22 accordingly. In the preferred embodiment, the throttle adjustment means comprises a system motion control arrangement 160 (shown in FIG. 1) which is operative for performing the logical control functions of system 10. While not shown in detail, those skilled in the art will appreciate that system motion control arrangement 160 includes a programmable motion controller and a driver. The motion controller includes a control program for receiving the control signal from potentiometer 140 and generating a proportional output signal. The output signal is received by the driver and converted into pulses. Suitable motion control arrangements are commercially available from various sources, including but not limited to Industrial Devices Corporation of Novato, Calif.

System motion control arrangement 160 is appropriately connected to a vehicle electrical power supply 162, such as the battery illustrated in FIG. 1. Motion control arrangement 160 is also connected to potentiometer 140 through wire harness 144 which extends through the fire wall. More particularly, the wires of wire harness 144 are connected to the analog input terminals (not shown) on control arrangement 160. In the embodiment illustrated, control arrangement 160 is adapted to be located on the fire wall. However, it will be appreciated by those skilled in the art that alternate locations are acceptable.

In the preferred embodiment, the throttle adjustment means further includes a stepper motor 172 for producing a mechanical output for controlling throttle mechanism 24. A second electrical wire harness 174 extends from an output connection of the system motion control arrangement 160 and serves to interconnect system motion control arrangement 160 and stepper motor 172. The stepper motor 172 is preferably securely fastened to a mounting bracket 175 that is in turn securely fastened internal combustion engine 20 adjacent to carburetor 22. Throttle control linkage 24 is mechanically connected to stepper motor 172 by a motor shaft 176 through a coupling 178.

Throttle control linkage 24 and throttle control cable 36 are intended to depict a conventional throttle control apparatus arranged for actuation by accelerator pedal 28 located in driver's compartment 14 of vehicle 12. In the exemplary configuration shown, electronically controlled, auxiliary throttle arrangement 34 operates in conjunction with this conventional throttle control linkage 24 to provide a second manner for operator control of the engine throttle.

Figure 5:
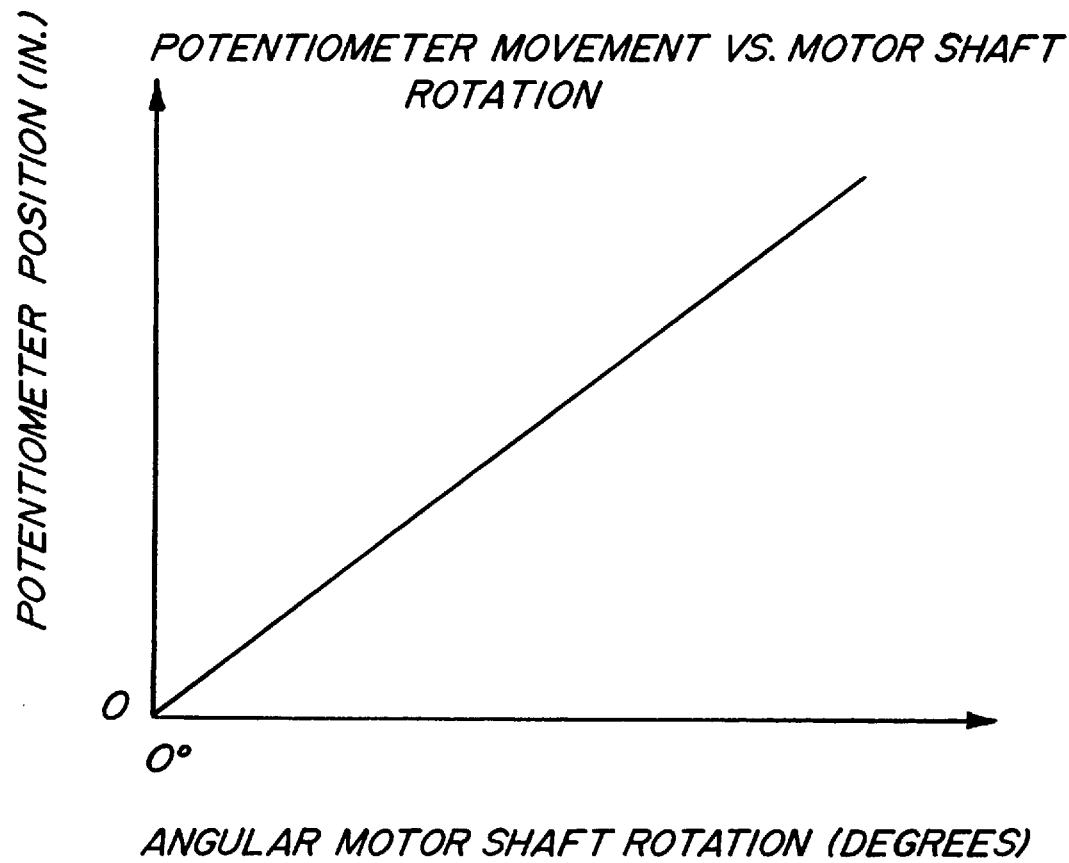
FIG. 5 is a graph representing the proportional relationship of potentiometer position to the rotational movement of the stepper motor shaft.

Referring to FIG. 5, a graph is illustrated showing the proportional relationship of the linear displacement of shaft 142 of potentiometer 160 to the rotational movement of the stepper motor shaft 176. Contrary to conventional mechanically interconnected throttle control arrangements, the slope and degree of linearity of the curve shown is determined by the controller program of system motion control arrangement 160 and may be readily adjusted to match the performance requirements and operating conditions of particular applications.

To ensure a complete understanding of the present invention, the operation of system 10 heretofore detailed will now be briefly described. With the palm of the operator's right hand cupped about handle assembly, the index finger or middle finger may easily access trigger member 40 for actuation. Operation of system 10 is initiated by the driver of the vehicle providing manual input by means of manipulating the trigger member 40 of handle assembly 42. As the position of trigger member 40 is changed, a correlative movement of shaft 142 of potentiometer 140 occurs. This change in the position of potentiometer shaft 142 functions to vary the voltage drop across the terminals of potentiometer 140, thereby changing the analog control signal supplied to the motion control arrangement 160. The control program of the controller portion of system motion control arrangement 160 is adapted to evaluate the analog control signal from potentiometer 140 and produce a proportional output signal with respect to criteria that is application specific. The output signal commands are converted into pulses by the driver portion of motion control arrangement 160 and responded to by stepper motor 172. Rotational output of stepper motor 172 directly produces control of throttle linkage 24.

Thus, throttle controlled system 10 of the present invention provides an improvement over the various prior designs by providing a system for electronically controlling the throttle of a manual transmission vehicle 12. Due to the high degree of flexibility of electronic control systems, various features can be readily incorporated in connection with the described exemplary embodiment. For example, an operator controlled on/off switch can be integrated in to the control circuit. Also, closed loop control of system 10 can be provided by supplying feedback from an encoder device mounted with stepper motor 172 to monitor shaft position. Further, feedback from a tachometer device can supply engine rpm data.

While the above description constitutes the preferred embodiment of the present invention, it will be appreciated that the invention is susceptible to modification, variation, and change without departing from the proper scope or fair meaning of the accompanying claims. For example, in an optional configuration, the stepper motor 172 can be operated as the sole mover of throttle control linkage 24. This configuration would preferably also incorporate an additional input device similar to potentiometer 140 located in shift lever handle 42 to be connected to accelerator pedal 28 of vehicle 12. An additional wire harness (not shown) would connect the input device to system motion control arrangement 160 and provide a parallel manner of electronically controlling the throttle linkage 24 of vehicle 12.

What is claimed is:

1. An electronically actuated throttle control system for an automotive vehicle having an engine compartment, a driver's compartment, a manual transmission and a gear shift lever interconnected with the manual transmission, and a carburetor having a throttle control linkage located in the engine compartment, the electronically actuated throttle control system comprising:

a handle assembly attached to the gear shift lever;

a trigger member located in the driver's compartment under the control of a vehicle operator, said trigger member pivotally attached to said handle assembly for rotational movement between an actuated and a non-actuated position;

a release mechanism operatively arranged with the trigger member for selectively preventing rotation of the trigger member;

signal generating means for generating a control signal indicative of the position of the trigger member, said signal generating means located in the driver's compartment; and throttle adjustment means for receiving the control signal and adjusting the throttle control linkage mechanism in response thereto, wherein the throttle adjustment means includes means for generating an output signal proportional to the control signal and positioning means for positioning the throttle control linkage in response to the output signal.

2. The throttle control system of claim 1, wherein the signal generating means comprises a potentiometer interconnected with the trigger member.

3. The throttle control system of claim 2, wherein said gearshift lever defines a cavity and further wherein said potentiometer is disposed within said cavity.

4. The throttle control system of claim 2, wherein said potentiometer is a linear potentiometer having a shaft interconnected with the trigger member, the shaft being linearly movable between a non-actuated and a fully actuated position.

5. The throttle control system of claim 1, wherein the positioning means comprises a stepper motor.

6. An electronically actuated auxiliary throttle control system for an automotive vehicle of the type having an engine compartment, a driver's compartment, a manual transmission, a carburetor located in the engine compartment, and a throttle control linkage operatively associated with the carburetor for controlling fuel flow thereto, the electronically actuated auxiliary throttle control system comprising:

a gear shift lever extending into the driver's compartment, said gear shift lever defining a cavity;

a trigger member under the control of a vehicle operator attached to the gear shift lever, said trigger member mounted in a handle assembly attached to the gear shift lever;

a release mechanism operatively arranged with the trigger member for selectively preventing movement of the trigger member;

a signal generator disposed within said gear shift lever cavity and operable for generating a control signal indicative of the position of the trigger member; and a motion control arrangement electrically interdisposed between the signal generator and the throttle control linkage for controlling movement of the throttle control linkage in response to the control signal.

7. The throttle control system of claim 6, wherein the trigger member is pivotally mounted to the handle assembly and the signal generator comprises a potentiometer interconnected with the trigger member for generating the control signal.

8. The throttle control system of claim 7, further comprising a stepper motor interconnecting the motor control arrangement and the throttle control linkage.

9. The throttle control system of claim 7, wherein said potentiometer is a linear potentiometer having a shaft interconnected with the trigger member, the shaft being linearly movable between a non-actuated and a fully actuated position.

10. The throttle control system of claim 6, wherein the trigger member is pivotally mounted to the handle assembly and further wherein the release mechanism includes a pin member linearly movable between a first position for preventing rotation of the trigger member and a second position for permitting rotation of the trigger member.

11. A throttle control system for an automotive vehicle having a driver's compartment, an engine compartment, a manual transmission, and a carburetor including a throttle control linkage located in the engine compartment, the throttle control system comprising:

a primary throttle control arrangement including a foot actuated pedal mechanically interconnected with the throttle control linkage;

an auxiliary throttle control arrangement electronically interconnected with the throttle control linkage, the auxiliary throttle control arrangement including:

a gear shift lever connected with the manual transmission for shifting the manual transmission, the gear shift lever including a handle assembly located in the driver's compartment, the handle assembly including a trigger member under the control of a vehicle operator, the trigger member being pivotally movable between a non-actuated position and a fully actuated position;

a release mechanism operatively arranged with the trigger member for selectively preventing movement of the trigger member;

a signal generator located in the driver's compartment for generating a control signal indicative of the position of the trigger member; and a motion control arrangement electrically interdisposed between the signal generator and the throttle control linkage for controlling movement of the throttle control linkage in response to the control signal.

12. The throttle control system of claim 11, wherein the auxiliary throttle control arrangement further includes a stepper motor interconnecting the motor control arrangement and the throttle control linkage.

13. The throttle control system of claim 11, wherein the trigger member is pivotally mounted to the handle assembly and further wherein the release mechanism includes a pin member linearly movable between a first position for preventing rotation of the trigger member and a second position for permitting rotation of the trigger member.

14. The throttle control system of claim 11, wherein the signal generator comprises a linear potentiometer including a shaft interconnected with the trigger member, the shaft being linearly movable between a non-actuated position and a fully actuated position.

15. The throttle control system of claim 11, wherein the handle assembly defines a cavity, and further wherein said signal generator is disposed within said cavity.

16. An electronically actuated throttle control system for an automotive vehicle having an engine compartment, a driver's compartment, and a carburetor having a throttle control linkage located in the engine compartment, the electronically actuated throttle control system comprising:

a gear shift lever located in the driver's compartment under the control of the vehicle operator;

a handle assembly attached to the gear shift lever;

a trigger member mounted in said handle assembly;

a release mechanism operatively arranged with the trigger member for selectively preventing movement of the trigger member;

signal generating means for generating a control signal indicative of the position of the movable element; and throttle adjustment means for receiving the control signal and adjusting the throttle control linkage mechanism in response thereto.

17. An electronically actuated fuel delivery system for an automotive vehicle having an engine compartment, a driver's compartment, and a fuel control assembly located in the engine compartment, the electronically actuated fuel delivery system comprising:

a. gear shift lever located in the driver's compartment under the control of a vehicle operator;

a handle assembly attached to the gear shift lever;

a trigger member mounted in said handle assembly;

a release mechanism operatively arranged with the trigger member for selectively preventing movement of the trigger member;

signal generating means for generating a control signal indicative of the position of the trigger member, said signal generating means located in the driver's compartment; and throttle adjustment means for receiving the control signal and adjusting the fuel control assembly in response thereto.

* * * * *